3,538,155
CYCLIC BORAPHOSPHONITRILE COMPOUNDS AND METHODS

Charles D. Schmulbach, Murphysboro, Ill., assignor, by mesne assignments, to Research Corporation, New York, N.Y., a non-profit corporation of New York
No Drawing. Filed Feb. 6, 1967, Ser. No. 613,987
Int. Cl. C07f 9/22; A01n 9/36
U.S. Cl. 260—543  14 Claims

ABSTRACT OF THE DISCLOSURE

Fungicidal cyclic boraphosphonitrile compounds and intermediate cyclic boraphosphonitrile halide salts and double salts are prepared by the reaction of a di- or trihalo boron compound with a quasiphosphonium halide.

SPECIFICATION

This invention relates to a new class of phosphorus-nitrogen-boron compounds and to a method for making these compounds.

The novel compounds of our invention are fungicidal cyclic boraphosphonitriles of the general formula:

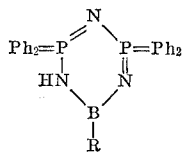

wherein Ph is phenyl and R is bromo, chloro or phenyl. According to the method of the present invention, these cyclic boraphosphonitriles are prepared by reacting a quasiphosphonium halide of the formula:

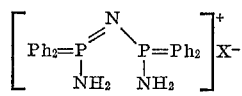

with a boron compound of the formula $RBX_2$ wherein X is bromo or chloro and R has the values given above. Since the preparative reaction, particularly in its earlier stages, is highly exothermic, the reaction is effected in the presence of a solvent.

As used herein, the term "phenyl" means the phenyl group or substituted phenyl groups such as halo substituted phenyls, e.g., chlorophenyl and bromophenyl, lower-alkoxy substituted phenyl, e.g., anisyl (p-methoxyphenyl), lower-alkyl substituted phenyl, e.g., tolyl (methylphenyl) and other non-interfering phenyl substituents generally known to those skilled in the art.

Without limiting the scope of our method to any particular theoretical mode of operation, the preparative reaction can be considered to occur in two stages. In the first stage, two moles of hydrogen halide are evolved and a cyclic boraphosphonitrile salt intermediate is formed as illustrated below:

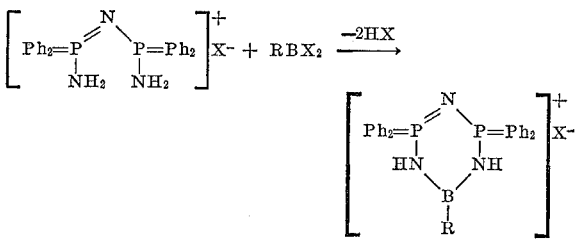

When at least two equivalents of the boron-containing reactant are employed, the cyclic intermediate may be isolated as a double salt of the formula:

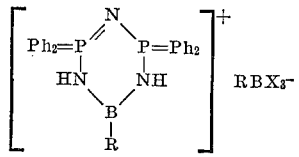

In the second stage, further heating is required to decompose the intermediate salt or double salt, drive off the third mole of hydrogen halide and form the boraphosphonitrile product compound.

The reactant quasiphosphonium halide may be prepared by the reaction of diphenyl phosphorus trichloride with ammonia as described in U.S. Pat. 3,080,422 to Bezman et al. In a preferred embodiment of the invention, the quasiphosphonium salt is dissolved or suspended in a hydrocarbon or halogenated hydrocarbon solvent such as 1,2-dichlorethane (the solvent is carefully dried prior to use). Since the initial reaction is highly exothermic, the reaction mixture is chilled prior to the gradual addition, under moisture-free conditions, of the boron reactant. Two molar equivalents of hydrogen halide are evolved spontaneously or on moderate warming. The intermediate cyclic boraphosphonitrile halide salt separates from the reaction mixture or may be recovered on evaporation of the solvent. If an excess of the boron reactant was initially added to the reaction mixture, a double salt intermediate forms and separates on cooling or evaporation of the solvent. Stronger heating, usually in conjunction with vacuum, is generally required to liberate and remove the third mole of hydrogen halide and the mole of boron reactant if present in the salt intermediate.

Our invention is further illustrated by means of the following non-limiting examples:

The reactant quasiphosphonium chloride of the formula $(C_6H_5)_4P_2N_3H_4Cl$ was prepared from diphenyl phosphorus trichloride and ammonia according to the procedure described by Bezman and Smalley, Chem. and Ind. 839 (1960). Phenyldichloroborane was prepared from tetraphenyl tin and boron trichloride according to the procedure of Niedenzu and Dawson, J. Am. Chem. Soc., 82, 4223 (1960). The 1,2-dichloroethane solvent was dried for 12 hours over anhydrous potassium carbonate and distilled prior to use.

EXAMPLE 1

Preparation of $[(C_6H_5)_4P_2N_3H_2BCl]^+BCl_4^-$. A suspension of 2.26 grams (5.00 millimoles) of $(C_6H_5)_4P_2N_3H_2Cl$ in 50 milliliters of dichloroethane was cooled to 5° in a salt-ice bath. Liquid boron trichloride was added in excess of 10.0 millimoles and the reaction mixture stirred under nitrogen until solution was complete. The reaction was permitted to proceed for several minutes and then the solvent, hydrogen chloride and excess boron trichloride were removed under reduced pressure at room temperature. The residual solid material was washed with dry benene in a closed system and recrystallized from dichloroethane. The product compound reacts strongly with water and alcohol with the formation of hydrogen chloride and boric acid.

EXAMPLE 2

Preparation of $[(C_6H_5)_4P_2N_3H_2BBr]^+BBr_3Cl^-$. The compound was prepared by the method of the previous example using boron tribromide in place of boron trichloride.

EXAMPLE 3

Preparation of $[(C_6H_5)_4P_2N_3H_2B(C_6H_5)]^+C_6H_5BCl_3^-$.
To a suspension of 2.26 grams of $(C_6H_5)_4P_2N_3H_4Cl$ in 50 milliliters of dichlorethane, 1.6 grams (10 millimoles) of phenyldichloroborane was added at room temperature. The $(C_6H_5)_4P_2N_3H_4Cl$ dissolved immediately with the evolution of hydrogen chloride gas. The reaction mixture was refluxed for two hours and 2.5 grams of solid separated on cooling. The solid was purified by washing with n-pentane and recrystallized from a mixture of nitrobenzene and n-pentane. The product compound is difficultly soluble in chloroform, tetrachloroethane and dichloroethane. It is insoluble in water and hydrolyzes only slowly but is soluble in ethanol with apparent reaction and evolution of hydrogen chloride.

EXAMPLE 4

Preparation of $[(C_6H_5)_4P_2N_3H_2B(C_6H_5)]^+Cl^-$. The product compound was prepared by the general method of the previous example except that only an equimolar quantity of phenyldichloroborane was employed. The product compound was purified by recrystallization from a mixture of dichloroethane and n-pentane.

EXAMPLE 5

Preparation of $[(C_6H_5)_4P_2N_3H_2BCl]^+Cl^-$. The product compound was prepared by allowing an equimolar mixture of $(C_6H_5)_4P_2N_3H_4Cl$ and boron trichloride in dichloroethane to react at room temperature for about one hour. Since the initial reaction was highly exothermic, the boron trichloride was added dropwise to a suspension of $(C_6H_5)_4P_2N_3H_4Cl$ in dichloroethane cooled to 0° C. in an ice bath. After the reaction was complete, the solvent was removed under vacuum and the residual solid recrystallized from dichloroethane. The product chloride salt is less reactive to hydrolysis than the corresponding tetrachloroborate double salt of Example 1.

EXAMPLE 6

Preparation of $[(C_6H_5)_4P_2N_3H_2BBr]^+Cl^-$. The product compound was prepared by the method of Example 5 using boron tribromide in place of boron trichloride. The product was likewise purified by recrystallization from dichloroethane.

EXAMPLE 7

Preparation of $(C_6H_5)_4P_2N_3HBCl$. A suspension of 2.26 grams (5.00 millimoles) of $(C_6H_5)_4P_2N_3H_4Cl$ in 50 milliliters of dichloroethane was mixed with 0.41 milliliter (5.0 millimoles) of boron trichloride in a reaction vessel chilled in an ice bath. The clear solution was allowed to warm to room temperature and approximately 2 molar equivalents of hydrogen chloride were evolved. The reaction mixture was then refluxed for three hours to drive off the third mole of hydrogen chloride. The white crystalline residue obtained on evaporation of the solvent was recrystallized from a mixture of dichlorethane and n-pentane. The product compound is relatively stable to hydrolysis and exhibits only a slight reaction when left in contact with cold water for several hours.

EXAMPLE 8

Preparation of $(C_6H_5)_4P_2N_3HBBr$. The product compound was prepared from a 1:1 reaction mixture by the same general procedure described in Example 7 using boron tribromide in place of boron trichloride. Six hours of reflux time were necessary to drive off the third mole of hydrogen bromide.

EXAMPLE 9

Preparation of $(C_6H_5)_4P_2N_3HB(C_6H_5)$. Two grams (3.7 millimole) of the product of Example 3 was heated at 230° C. for 48 hours at a pressure of 0.5 millimeter of mercury. Hydrogen chloride gas was evolved; the substantially pure product compound sublimed from the system. It is difficultly soluble in chloroform and dichloroethane and very stable to hydrolysis.

The experimental yields melting points (uncorrected open capillary) and analysis obtained are summarized in Table I.

TABLE I

| Ex. | Compound | Percent, yield | MP., °C. | Percent, N Found | Percent, N Calcd. | Percent, P Found | Percent, P Calcd. | Percent, B Found | Percent, B Calcd. | Percent, Br+Cl Found | Percent, Br+Cl Calcd. |
|---|---|---|---|---|---|---|---|---|---|---|---|
| 1 | $[(C_6H_5)_4P_2N_3H_2BCl]BCl_4$ | 81 | 204 | 6.81 | 6.85 | 10.21 | 10.10 | 3.70 | 3.53 | 28.13 | 28.90 |
| 2 | $[(C_6H_5)_4P_2N_3H_2BBr]BBr_3Cl$ | 77 | 204 | 5.13 | 5.31 | 7.73 | 7.83 | 2.59 | 2.73 | 45.00 | 44.88 |
| 3 | $[(C_6H_5)_4P_2N_3H_2B(C_6H_5)]B(C_6H_5)Cl_3$ | 75 | 340 | 6.20 | 6.03 | 9.12 | 8.89 | 3.29 | 3.11 | 15.30 | 15.27 |
| 4 | $[(C_6H_5)_4P_2N_3H_2B(C_6H_5)]Cl$ | 70 | 323–325 | 6.71 | 7.81 | 11.37 | 11.52 | 1.94 | 2.01 | 6.96 | 6.59 |
| 5 | $[(C_6H_5)_4P_2N_3H_2BCl]Cl$ | 90 | 302–304 | 8.29 | 8.47 | 12.26 | 12.49 | 2.30 | 2.18 | 14.20 | 14.29 |
| 6 | $[(C_6H_5)_4P_2N_3H_2BBr]Cl$ | 78 | 201 dec. | 7.10 | 7.77 | 11.25 | 11.46 | 1.42 | 2.00 | 21.30 | 21.34 |
| 7 | $(C_6H_5)_4P_2N_3HBCl$ | 79 | 304–306 | 8.93 | 9.14 | 12.93 | 13.48 | 2.67 | 2.35 | 7.34 | 7.71 |
| 8 | $(C_6H_5)_4P_2N_3HBBr$ | 83 | 328–330 | 8.38 | 8.34 | 11.71 | 12.23 | 1.85 | 2.15 | 16.20 | 15.85 |
| 9 | $(C_6H_5)_4P_2N_3HB(C_6H_5)$ | 80 | 210 | 8.14 | 8.38 | 12.49 | 12.36 | 1.96 | 2.16 | 0.00 | 0.00 |

The infrared absorption spectra of these compounds were measured in mulls with Nujol or hexachlorobutadiene. All of the spectra demonstrate a single band in the region of 3290–3160 cm.$^{-1}$ assigned to the N—H stretching vibration, and a band in the 3075–3050 cm.$^{-1}$ region characteristic of the aromatic C—H stretching frequency. The spectra also demonstrate absorption in the region of 1435–1445 cm.$^{-1}$ and 965–992 cm.$^{-1}$ attributed to the P—C (phenyl) bond. The ring B—N stretching vibrations in the 1328–1395 cm.$^{-1}$ region demonstrated by these boraphosphonitriles lie close to the characteristic borazine ring stretching vibrations in the 1400 cm.$^{-1}$ region, and the medium-to-strong band at 1020–1025 cm.$^{-1}$ falls close to the 1030 cm.$^{-1}$ in plane N—H stretching band exhibited by borazine compounds.

The compounds of the present invention exhibit fungicidal activity comparable to that of commercial fungicides when tested according to standard methods against various economically important fungi. Each compound was incorporated at graded concentrations into Potato Dextrose Agar and the plates inoculated with the test fungi. After incubation, the amount of growth of the test fungus in each plate was measured (average diameter in centimeters). The fungicidal effectiveness of the compounds are seen by comparing growth at various concentrations with the amount of growth exhibited by an inoculated control. In the test results summarized below, a growth value of zero centimeters is used to indicate complete inhibition of the test fungus.

| Compound | Centimeters of growth, *Alternaria solani* | | | | Centimeters of growth, *Monilinia fructicola* | | | |
|---|---|---|---|---|---|---|---|---|
| | 20 p.p.m. | 100 p.p.m. | 500 p.p.m. | Control | 20 p.p.m. | 100 p.p.m. | 500 p.p.m. | Control |
| Example 1 | 30 | 27 | 12 | 35 | 26 | 28 | 0 | 28 |
| Example 2 | 35 | 32 | 15 | 35 | 28 | 33 | 0 | 28 |
| Example 3 | 32 | 20 | 12 | 35 | 20 | 0 | 0 | 28 |
| Example 5 | 35 | 13 | 4 | 35 | 28 | 0 | 0 | 28 |
| Example 7 | 25 | 13 | 0 | 35 | 25 | 0 | 0 | 28 |
| Example 8 | 26 | 12 | 3 | 35 | 25 | 0 | 0 | 28 |
| Example 9 | 35 | 23 | 13 | 35 | 29 | 16 | 0 | 28 |

In similar experiments, the compounds of Examples 3 and 7 were highly active against Geotrichum spp., *Corticium fuciforme, Orange gleosporium* and *Helminthosporium sativum*, and moderately active against *Rhizoctonia solani, Septoria apii* and *Scerotium rolfsii*. The compound of Example 8 gave results generally similar to but less active than those obtained with the compound of Example 7 against these fungi. The compounds of Examples 3, 7, 8 and 9 were highly inhibitory to *Phytophthora infestans*, and all of the compounds tested were slightly inhibitory to *Fusarium roseum*.

The compounds of the present invention also exhibit herbicidal activity as demonstrated by tests on duckweed and algae. At concentrations of 100 p.p.m. in Hoaglund's media, the compounds of the examples were highly toxic to duckweed and inhibited the growth of algae.

The invention described herein was made in the course of or under a grant from the National Science Foundation, an agency of the U.S. Government.

I claim:

1. Compounds of the formula:

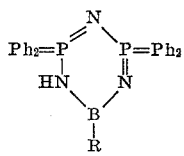

wherein R is bromo, chloro or phenyl.

2. A compound according to claim 1 having the formula:

$(C_6H_5)_4P_2N_3HBCl$

3. A compound according to claim 1 having the formula:

$(C_6H_5)_4P_2N_3HB(C_6H_5)$

4. A compound according to claim 1 having the formula:

$(C_6H_5)_4P_2N_3HBBr$

5. A method for preparing compounds of the formula:

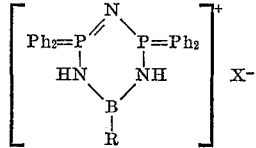

wherein R is bromo, chloro or phenyl and X is bromo or chloro, which comprises reacting molar equivalents of a compound of the formula:

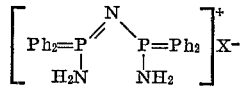

with a compound of the formula $RBX_2$ at about room temperature until two moles of hydrogen halide are evolved.

6. Compounds of the formula:

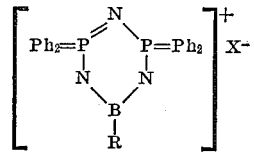

wherein R is bromo, chloro or phenyl and X is bromo or chloro.

7. A compound according to claim 6 having the formula:

$[(C_6H_5)_4P_2N_3H_2BCl]Cl$

8. A compound according to claim 6 having the formula:

$[(C_6H_5)_4P_2N_3H_2B(C_6H_5)]Cl$

9. A compound according to claim 6 having the formula:

$[(C H_5)_4P_2N_3H_2BBr]Cl$

10. A method for preparing compounds of the formula:

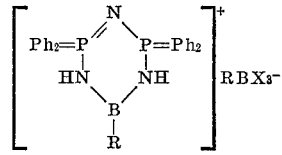

wherein R is bromo, chloro or phenyl and X is bromo or chloro, which comprises reacting a compound of the formula:

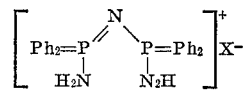

with at least two molar equivalents of a compound of the formula $RBX_2$ at about room temperature until two moles of hydrogen halide are evolved.

11. Compounds of the formula:

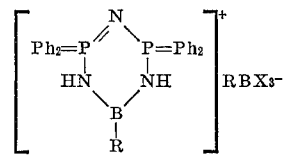

wherein R is bromo, chloro or phenyl and X is bromo or chloro.

12. A compound according to claim 11 having the formula:

$[(C_6H_5)_4P_2N_3H_2BCl]BCl_4$

13. A compound according to claim 11 having the formula:

$[(C_6H_5)_4P_2N_3H_2B(C_6H_5)]B(C_6H_5)Cl_3$

14. A compound according to claim 11 having the formula:

$[(C_6H_5)_4P_2N_3H_2BBr]BBrCl_3$

References Cited

UNITED STATES PATENTS 3,060,234  10/1962  Boone ---------------- 260—551

OTHER REFERENCES

Schmulbach et al., J. Inorg. Nucl. Chem. 25, 1395 (1963).

LORRAINE A. WEINBERGER, Primary Examiner

R. GERSH, Assistant Examiner

U.S. Cl. X.R.

260—551; 424—185